US008252183B1

(12) United States Patent
Massingill et al.

(10) Patent No.: US 8,252,183 B1
(45) Date of Patent: Aug. 28, 2012

(54) TREATING NITOROGEN-CONTAMINATED WASTEWATERS

(75) Inventors: Michael J. Massingill, San Diego, CA (US); Gregory Schwartz, Indio, CA (US); Christian-Dominik Henrich, San Diego, CA (US); Timothy R. Wells, La Plata, MD (US); Wayne Sterud, Palm Desert, CA (US); James Carlberg, San Diego, CA (US); Jon C. Van Olst, Bonsall, CA (US)

(73) Assignee: Kent BioEnergy Corporation, San Diego, CA (US)

( * ) Notice: Subject to any disclaimer, the term of this patent is extended or adjusted under 35 U.S.C. 154(b) by 0 days.

(21) Appl. No.: 13/341,964

(22) Filed: Dec. 31, 2011

Related U.S. Application Data

(60) Provisional application No. 61/552,653, filed on Oct. 28, 2011.

(51) Int. Cl.
    *C02F 3/32* (2006.01)
(52) U.S. Cl. ........ 210/602; 210/603; 210/631; 210/206; 210/259; 210/903
(58) Field of Classification Search .................. 210/602, 210/603, 612, 631, 198.1, 206, 252, 259, 210/903
See application file for complete search history.

(56) References Cited

U.S. PATENT DOCUMENTS

| 5,820,761 | A * | 10/1998 | Holzer et al. ............... 210/631 |
| 7,850,848 | B2 * | 12/2010 | Limcaco ...................... 210/602 |
| 2002/0030012 | A1 * | 3/2002 | Sullivan et al. ............. 210/631 |
| 2005/0115893 | A1 * | 6/2005 | Brune et al. ................. 210/602 |

FOREIGN PATENT DOCUMENTS

| EP | 1516857 A1 * | 3/2005 |
| JP | 59-59296 A * | 4/1984 |

* cited by examiner

*Primary Examiner* — Fred Prince, Jr.
(74) *Attorney, Agent, or Firm* — Richard D. Clarke

(57) ABSTRACT

An exemplary method of treating nitrogen-contaminated wastewaters, especially those with high ammonia concentrations, according to the invention includes the steps of ammonia degassing and recapture, and of nutrient assimilation with microalgae. Organic nitrogen, organic carbon, phosphorus, heavy metals and other compounds may also be removed in different embodiments of the invention. Examples of applicable wastewaters include landfill leachate, municipal solid waste anaerobic digester effluent, agricultural anaerobic digester effluent, municipal wastewaters, agricultural wastewaters, and other similarly contaminated wastewaters.

26 Claims, 10 Drawing Sheets

FIG. 9 Actual ammonia removal efficiencies of the ARA pilot plant at 6 hr stripping time, varying design pH and temperature compared to model predictions.

| | Raw Leachate Inflow | Treated Effluent | Monthly EPA-NPDES Limits for Landfills (per CFR40-445) |
|---|---|---|---|
| BOD (5-day), mg/L | 1120 | 8 | 37 |
| Total Suspended Solids, mg/L | 180 | 12 | 27 |
| Ammonia Nitrogen, mg/L | 1350 | 1.3 | 4.9 |
| Alpha-Terpineol, mg/L | 2.09 | <0.010 | 0.016 |
| Benzoic Acid, mg/L | <1.25 | <0.050 | 0.071 |
| m, p, Cresol, mg/L | 0.491 | <0.010 | 0.014 |
| Phenol, mg/L | 0.549 | <0.010 | 0.015 |
| Zinc, mg/L | 0.21 | 0.11 | 0.11 |

TABLE 1: Example effluent constituents after leachate treatment with the ALT process, including ARR, AS, and CEP.

TREATING NITROGEN-CONTAMINATED WASTEWATERS

FIELD OF THE INVENTION

The present invention relates to a process of treating wastewaters. More particularly, the present invention relates to a process of treating nitrogen-contaminated wastewaters, especially those with high ammonia concentrations, to remove nitrogen, as ammonia nitrogen, nitrate nitrogen, biodegradable and non-biodegradable organic nitrogen, or any other form of nitrogen, as well as biodegradable and non-biodegradable oxygen demand, heavy metals and other metals, EPA-priority pollutants and other pollutants, sodium chloride and other dissolved solids, color, and total phosphorous.

BACKGROUND OF THE INVENTION

Nutrient-laden wastewaters are typically treated to remove organic and inorganic nitrogen through specific processes. Examples of nutrient-laden wastewaters include leachates, or the liquids that drain (or "leach") from landfills, or digester effluents; agricultural, industrial, and municipal wastewaters; and other similarly contaminated liquids.

The technologies in the prior art generally employ chemical and bacterial-based treatments, which, under specific aerobic or anoxic conditions, convert organic matter into ammonia (mineralization), ammonia into nitrite and nitrate (aerobic nitrification), and nitrite and nitrate into nitrogen gas (anoxic denitrification). These processes typically require, among other things, aerated and facultative lagoons, flocculation/clarification, activated sludge, sequencing batch reactors, membrane bio-reactors, reverse osmosis filtration, or other technologies.

The costs of each of these processes are related to the degree of treatment achieved, with nitrogen reduction typically being considered of high importance.

Previously, most U.S. state and federal environmental standards for effluent discharge ranged from 10 to 50 mg/L of Total Kjeldahl Nitrogen (TKN), which is calculated as the sum of organic nitrogen, ammonia ($NH_3$) and ammonium ($NH_4^+$) in the effluent. Because TKN standards do not include nitrate and nitrite forms of inorganic nitrogen, the least expensive methods of treatment were based on the oxidation of organic nitrogen to ammonia followed by bacterial nitrification, or the conversion of ammonia to nitrite or nitrate. Under these standards, nitrification technology alone was usually sufficient without requiring the use of more expensive denitrification technologies.

New effluent discharge standards of the U.S. Environmental Protection Agency for nitrogen content are presently moving toward a range of 3 to 30 mg/L or lower. Moreover, these limits are defined as Total Nitrogen (TN) rather than the prior TKN standard, which requires more complex treatment approaches. These changing standards require not only the elimination of organic and inorganic nitrogen concentrations, but cause bacterial nitrification of ammonia to nitrite or nitrate to "qualify" no longer by itself as nitrogen removal because of the change in measurements from TKN to TN. Therefore, these fractions must now be either removed or further converted to elemental nitrogen through denitrification processes, or converted into biomass and then removed through other biological processes. Moreover, most air quality standards no longer allow for the free release of ammonia into the atmosphere.

U.S. and European sewage treatment operators are finding that leachates and similar wastewaters are difficult waste streams to treat due to very high ammonia nitrogen concentrations. Ammonia can be toxic to the bacterial colonies in traditional bacterial-based treatment systems. Furthermore, the bacterial treatment of ammonia requires a significant increase in aeration or oxygen demand resulting in greater treatment load, greater system capacity requirements, and significantly increased treatment operating costs.

In many types of wastewaters to be treated such as landfill leachate and anaerobic digester effluent, ammonia represents the majority fraction of the total nitrogen contained within the wastewater (often more than 80%) and organic nitrogen represents the remainder. In the case of landfill leachates, anaerobic digester effluent or other high ammonia wastewaters:

(1) These high ammonia wastewaters can cause problems in sewage plants that are so severe that the plants cannot meet their own discharge requirements.

(2) Some sewage plants have been forced to add expensive new treatment equipment to be able to accept such wastewaters.

(3) Sewage plants in several states have stopped accepting such wastewaters completely, or have set strict new standards for accepting their flows. This increases the need for cost effective on-site leachate treatment systems.

(4) Other sewage plants have raised the treatment fees that landfill operators must pay (up to 20 cents per gallon), and/or are requiring expensive pretreatment before they will accept such wastewaters.

(5) Successful lawsuits by environmental groups are forcing the states and the EPA to implement tough new water quality standards that directly affect leachate disposal.

(6) The U.S. is following in the path of the European Union, where leachate already is regulated so strictly that sewage plants cannot accept leachate at all, or expensive pretreatment of leachate (costing up to 18 cents per gallon) is legally required.

It has recently been discovered that the presence of UV-absorbing compounds in some leachates can severely impact the effectiveness of ultraviolet light (UV) to provide disinfection in municipal wastewater treatment plants that treat such leachates. This can prevent such sewage treatment plants from meeting the EPA's goal to replace chlorine-based disinfection with the more environmentally safe UV disinfection process.

Unfortunately, most prior art processes do not attempt to recapture and recycle the valuable, energy-intensive, nitrogen products contained in wastewaters. In particular, early efforts to remove ammonia through degassing were more expensive or complex in comparison to simple nitrification processes and also were usually not concerned with preventing the release of ammonia into the atmosphere. Today, ammonia-rich emissions are no longer permitted due to environmental concerns.

Examples of such process in the prior art include the use of acidic solutions (as in U.S. Pat. Nos. and Patent Application Publication No. 4,308,049; 5,238,580; 7,270,796; and 2007/0297953), the evaporation or vaporization of leachate (as in U.S. Pat. Nos. 4,838,184; 5,542,482; 5,601,040; and 5,934,207); the recirculation of leachate within landfills (as in U.S. Pat. Nos. and Patent Application Publication No. 5,605,417; 6,024,513; 6,364,572; 6,398,958; and 2004/0191755); magneto-hydrodynamic, electrolytic and reverse osmosis processes (as in U.S. Pat. Nos. 4,678,582; 4,995,969; 6,428,697; and 7,517,456); and biological processes (as in U.S. Pat. Nos. 4,678,582 and 4,995,969).

U.S. Patent Application Publication No. 2009/0227003 to Blotsky et al. teaches methods and systems for biomass recycling and energy production that employ microbial digester units (aerobic and anaerobic) and algae production units. The Blotsky disclosure deals with the recycling of a biomass formed of solids and liquids than the recovery of ammonia from wastewaters and teaches microbial digester units that require extended time periods to perform the desired processes and possibly large surface areas to operate.

Therefore, there is a need for a method of treatment of ammonia-laden wastewaters that provides substantially nitrogen-free effluents at a low operational cost.

SUMMARY OF THE INVENTION

The present invention teaches a method of removing ammonia nitrogen and optionally organic nitrogen, phosphorus, heavy metals and other compounds from wastewaters. A process according to the invention significantly reduces the total nutrient content of wastewaters through a physicochemical process of ammonia degassing and recapture that is operatively coupled with a biological process of nutrient assimilation based on algal and bacterial growth.

In one embodiment, a method according to the present invention includes an ammonia removal step and an ammonia recapture step, based on an ammonia removal and recovery process (ARR), and an algal water treatment step, based on a controlled eutrophication process (CEP).

In another embodiment, a method according to the present invention includes the steps of precipitating phosphate and metals; recovering ammonia through an ARR having the substeps of ammonia degassing and ammonia recapture; adding carbon dioxide from biogas or other carbon dioxide sources to reduce pH, avoid greenhouse gas (GHG), provide carbon nutrient, and clean the biogas; treating effluent water with activated sludge; treating effluent water with algae through a CEP; harvesting and removing the algae to provide final clean treated water; and reducing wastewater volume by controlling precipitation input to the CEP. Some of these steps may be removed, or other may be added (for example, polishing after harvest) to meet specific local conditions.

Polishing or further treatment after harvest of algae can include membrane processes like reverse osmosis (RO), filtering processes like microfiltration (MF), oxidation processes like treatment with ultraviolet radiation, ozone, chlorine, ferrate or other oxidants (OX), and evaporation for example in enhanced evaporation ponds.

A primary aspect of the present invention is to provide a low cost yet highly effective method of removing ammonia from wastewater.

Another aspect of the present invention is to generate byproducts, such as algae or algae-derived products which include amongst others, lipids, proteins, and carbohydrates, or combustible gases, that have industrial uses.

A further aspect of the present invention is to provide a method of treating wastewater that has a limited footprint and as is at least partly transportable.

Yet another aspect of the present invention is to enable a continuous wastewater inflow into the process while allowing extended periods with no treated effluent discharge.

A further aspect of the present invention is to allow the CO2 and other acids like hydrogen sulfide (H2S) found in biogas to be captured and/or recycled to produce a cleaner biogas, increase the biogas methane content, reduce treatment costs, and reduce emissions of environmentally damaging green-house gases (GHG).

A further aspect of the present invention is that it allows for reduction/degradation of UV-absorbing compounds in landfill leachates or other wastewaters.

A further aspect of the present invention is the ability to produce clean nutrients (i.e. ammonia and derivatives thereof, such as ammonium salt fertilizers) from a contaminated liquid waste nutrient stream (such as landfill leachate or digester effluent) that could be used as fertilizer safely for human consumption products such as nutraceuticals, food, or other high value products.

A further aspect of the present invention is to provide a method to increase the treatability of nitrogen rich wastewaters by bacterial systems, such as heterotrophic or autotrophic bacterial populations found in activated sludge, in an overall cost effective way.

A further aspect of the present invention is to provide a method to significantly reduce the fouling rate of membrane processes, such as RO membranes, thereby significantly reducing for example reverse osmosis treatment costs for salt removal from wastewaters.

These and other aspects of the present invention will become apparent from a reading of the following description, and may be realized by means of the instrumentalities and combinations recited in the appended claims.

BRIEF DESCRIPTION OF THE DRAWINGS

The drawings constitute a part of this specification and include exemplary embodiments of the invention, which may be embodied in various forms. It is to be understood that in some instances various aspects of the invention may be shown exaggerated or enlarged to facilitate an understanding of the invention.

DETAILED DESCRIPTION OF EMBODIMENTS OF THE INVENTION

The present invention relates to a method of treating wastewaters to remove ammonia nitrogen and optionally organic nitrogen, phosphorus, heavy metals and other compounds from such wastewaters. Examples of applicable wastewaters are not only limited to landfill leachate, but also include municipal solid waste anaerobic digester effluent, agricultural anaerobic digester effluent, municipal wastewaters, agricultural wastewaters, and other similarly contaminated wastewaters. A process according to the present invention significantly reduces the total nitrogen and phosphorus content of these wastewaters through a physicochemical process of ammonia degassing and recapture, and biological processes of nutrient assimilation or removal using, microalgae.

Detailed descriptions of embodiments of the invention are provided herein. It should be understood, however, that the present invention may be embodied in various forms. Therefore, the specific details disclosed herein are not to be interpreted as limiting, but rather as a representative basis for teaching one skilled in the art how to employ the present invention in virtually any detailed system, structure, or manner.

Figure 1:
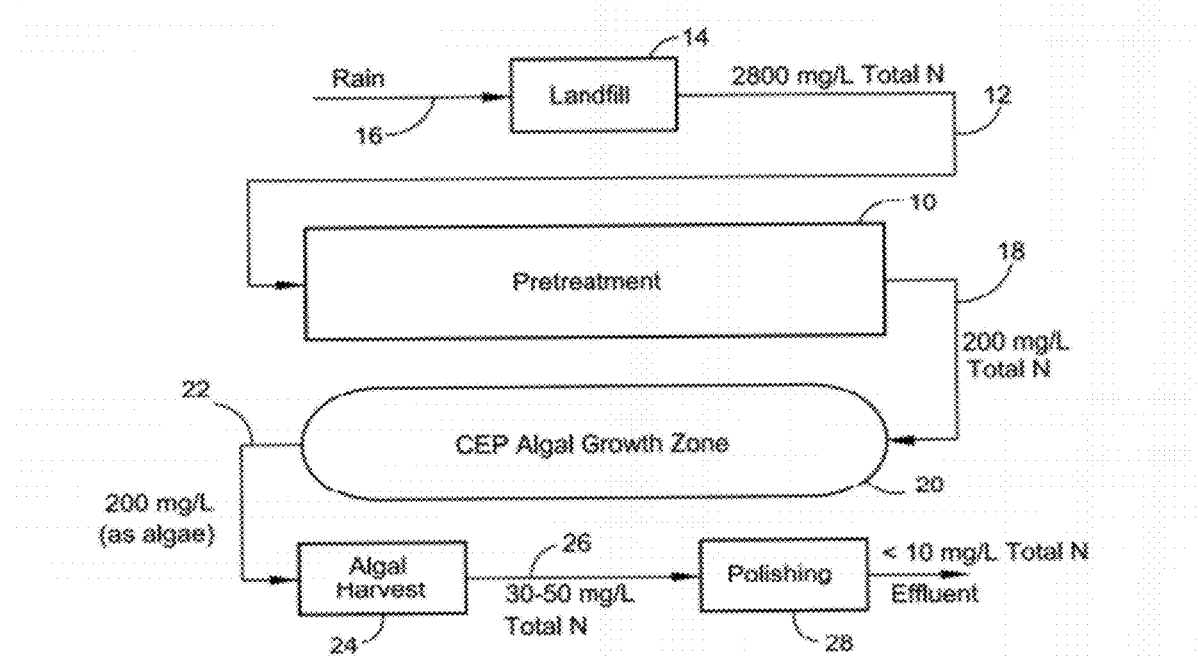
FIG. 1 illustrates a diagrammatic view of an exemplary process according to the invention.

A method according to the invention includes, in its most basic steps, chemical precipitation, an ammonia degassing and recapture step, which will be identified herein as an ammonia removal and recovery process (ARR), a bacterial treatment process, which will be identified herein as activated sludge (AS), an algae-based water treatment step, which will be identified herein as a controlled eutrophication process (CEP), a post treatment or polishing step, and an optional anaerobic treatment, which will be identified herein as anaerobic digester (AD). FIG. 1 illustrates the steps of such a process within an exemplary plant for the treatment of landfill leachate, including optional systems and steps.

A pretreatment unit 10 receives a leachate 12 generated by a landfill 14, for example, because of rain 16 falling over landfill 14. A person skilled in the art will appreciate that contaminated wastewaters other than landfill leachate may be treated with a process according to the invention, for example, industrial discharges, agricultural wastewaters, or municipal wastewaters.

Pretreatment unit 10 performs the ARR, which includes an ammonia degassing step and an ammonia recapture step.

In particular, the ARR removes ammonia from leachate 12 by degassing leachate 12 (the degassing step) and then immediately recaptures the ammonia as a fertilizer solution of for example ammonium sulfate (the ammonia recapture step), as described in greater detail hereinafter.

After the ARR, the pretreated wastewater (in the present example, pretreated leachate 18) is conveyed to an algal growth zone 20, where the CEP is performed. The CEP is based on a high-density algal growth and nutrient conversion process that efficiently reduces total nitrogen (TN) concentrations to below 10 ppm.

Algae in biomass water 22 are then harvested using suitable equipment 24, also as described in greater detail hereinafter. Remaining algal biomass 26 may be removed in a final polishing basin 28, for example by adding a flocculant, a polymer coagulant, a dissolved air floatation process, or membrane processes to produce a clean effluent.

Figures 11, 13:
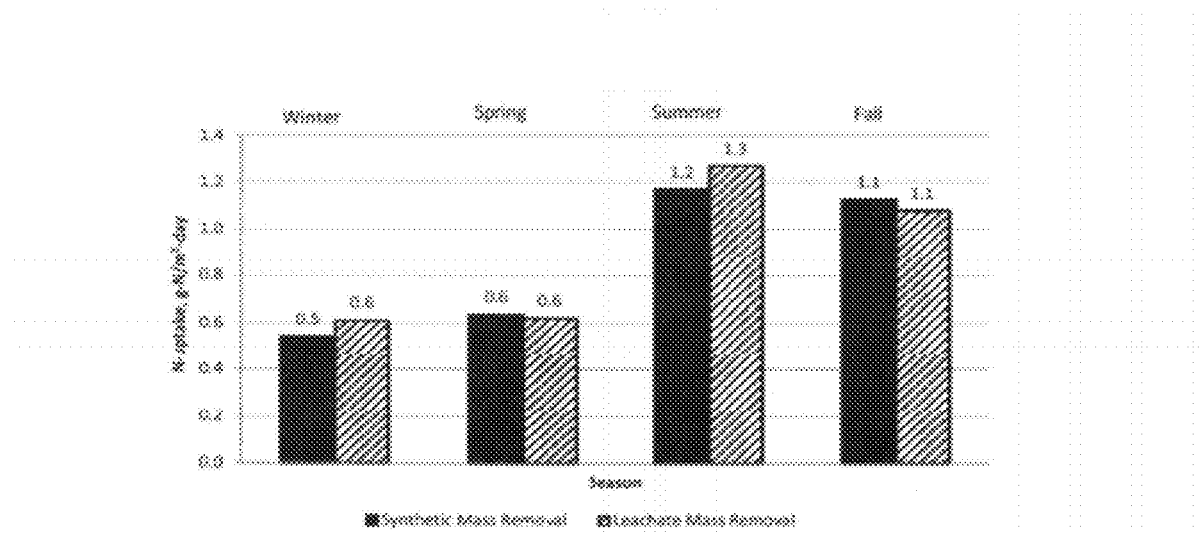
FIG. 11 is a graphical representation of exemplary algal Nitrogen uptake rates for different seasons throughout a year.
FIG. 13 illustrates Table 1 showing example effluent constituents after treatment of raw landfill leachate compared to possible EPA NPDES limits for landfills.

One of the benefits of a process according to the present invention is providing a low cost removal of nitrogen from wastewaters that contain high concentrations of ammonia while minimizing the footprint area needed for an algal growth and recovery system that produces a low final TN output in the final effluent. In particular, the combination of the ARR and of CEP enables the recapture and recycle of over 90% of the total nitrogen found in wastewaters like leachate and is designed to produce a final effluent that complies with increasingly stringent nutrient discharge standards. TABLE 1 in FIG. 13 shows exemplary effluent parameters compared to possible EPA NPDES limits for landfill leachates.

Therefore, a process according to the present invention provides a more economical and environmentally sustainable treatment process than other processes known in the art when ammonia represents a substantial portion of a wastewater's total nitrogen content.

The above described steps, as well as additional optional steps, will now be described in greater detail in the embodiment of the inventions shown in FIGS. 2-4, which include additional steps over the embodiment shown in FIG. 1.

Figure 2:
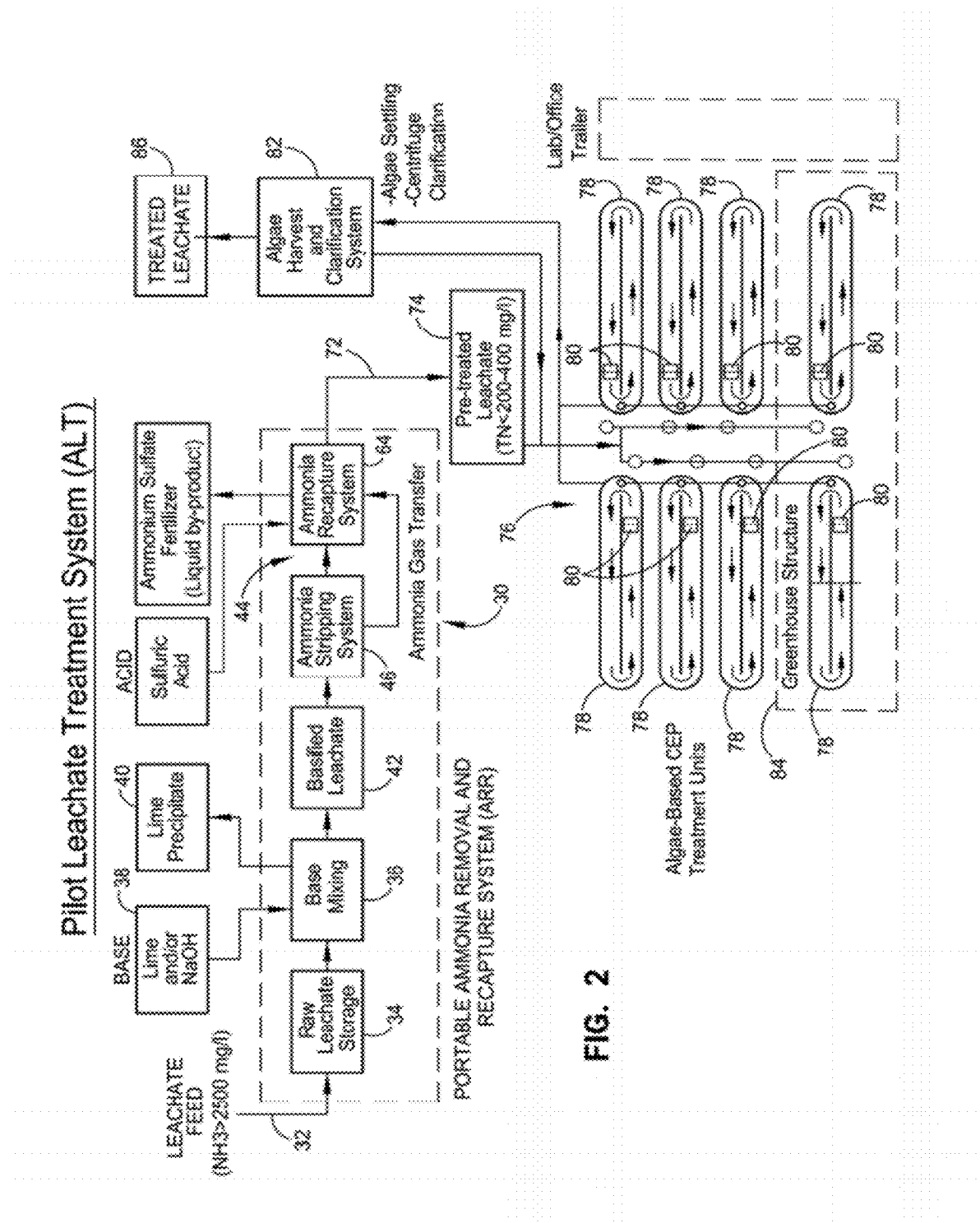
FIG. 2 illustrates a diagrammatic view of another exemplary process according to the invention.
Figure 3:
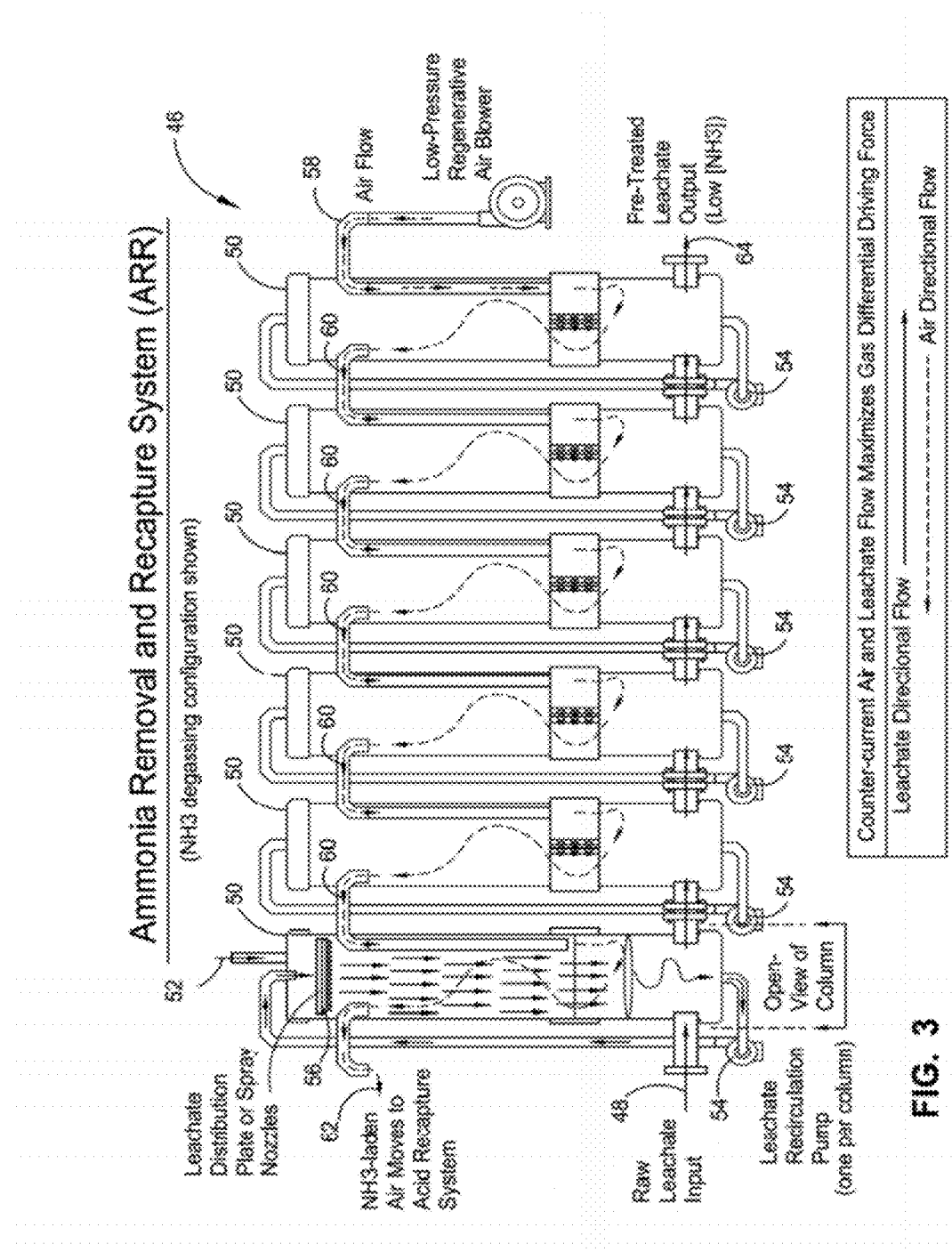
FIG. 3 illustrates a schematic view of the ammonia recovery portion of the process of FIG. 2.
Figure 4:
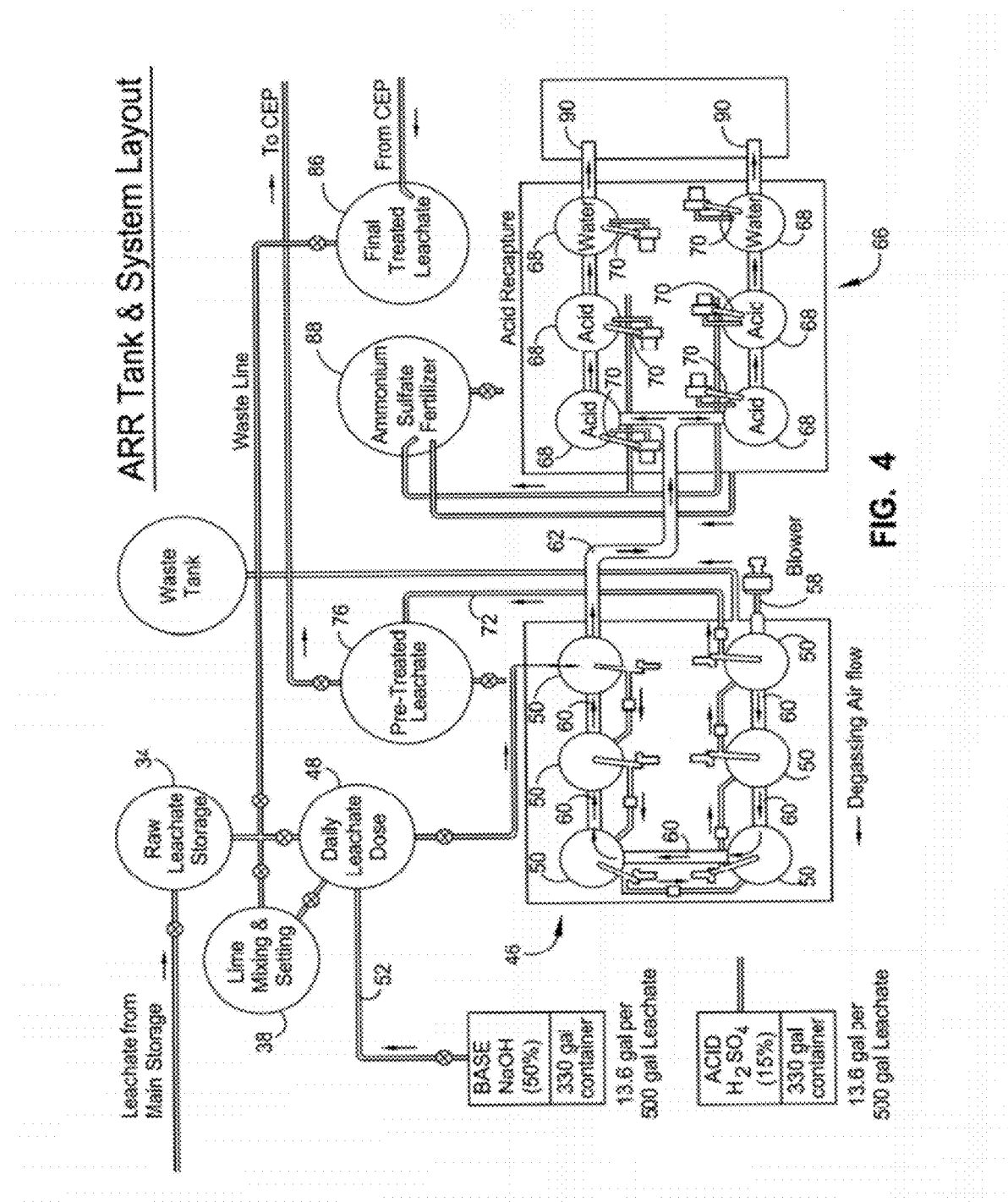
FIG. 4 illustrates a schematic view of a portion of the ammonia recovery and acid recapture portions of the process of FIG. 2 and of variants thereof.

The process of the embodiment depicted in FIGS. 2-4 may be subdivided into eight mandatory and/or optional steps:

STEP A—Phosphate and metals precipitation pre-treatment;
STEP B—ARP, which includes the following sub-steps:
(B1) Ammonia degassing, and
(B2) Ammonia recapture;
STEP C—Biogas addition of carbon dioxide, which is a pH reducing, greenhouse gas (GHG) avoidance, carbon nutrient, and biogas cleaning pre-treatment step;
STEP D—Bacterial treatment of biodegradable organics and BOD using an activated sludge (AS) system, or similar system;
STEP E—CEP, which is based upon water treatment with algae;
STEP F—Algae harvest and removal to provide final clean treated water;
STEP G—Membrane treatment for removal of TDS, chloride, salts, or other compounds; and
STEP H—Optional wastewater volume reduction by controlling precipitation input to the CEP.

With specific reference to FIG. 2, the pretreatment and ARR steps (steps (A) and (B) above) are performed in pretreatment system 30. More specifically, a wastewater (in the current embodiment, a leachate 32) is received in an initial storage unit 34, where it may be stored for later use, or which may act as a flow stabilizer for the fluid sent to the downstream units, so that downstream flow may be regulated as desired.

Storage unit 34 may include different constructive features, for example, may be a tank or a basin. Moreover, storage unit 34 may be sized for short term storage, when pretreatment system 30 is designed to operate on a year-round basis, or for long term storage, when pretreatment system 30 is designed to operate intermittently, for example, because of irregular leachate supplies, or because of climatic conditions that allow operation only during certain periods of the year. When intermittent use is planned, constructive features that prevent the intrusion of rainwater while still enabling evaporation may be added, as explained in greater detail below.

Storage unit 34 feeds the leachate to a base mixing unit 36, in which contaminants such as phosphorus, metals and other products are removed (step (A) above). In base mixing unit 36, the wastewater is mixed with a milk of lime solution 38, such as a suspension of calcium hydroxide ($CaCO_2$) in water, which precipitates phosphorous as well as metal contaminants. The undisclosed lime and precipitated contaminant particulates 40 are then settled and the wastewater supernatant is decanted for continued treatment. In addition, the settled material containing excess lime can be exposed to a soda ash solution containing sodium carbonate ($Na_2CO_3$) to convert any excess calcium hydroxide into dissolved sodium hydroxide (NaOH) and calcium carbonate ($CaCO_3$), which has low solubility. These steps of lime and sodium carbonate additions also produce "lime softening" or the removal of excess calcium as calcium carbonate precipitate. This process can be additionally important to the later-described process of reverse osmosis by reducing membrane fouling caused by calcium precipitation or scaling. The sodium hydroxide solution can then be recycled to the ARP process for pH control, as explained in greater detail below. Or NaOH or other strong bases can be used directly for this basification step.

The basified leachate 42 is conveyed to an ammonia recapture unit 44, which includes an ammonia stripping system 46 and an ammonia recapture system 64, within which the ARR is performed.

The ARR (step (B) above) is a two-step physicochemical process, the first step of which, ammonia degassing (step (B1) above), will now be described with reference to FIG. 3.

Ammonia degassing is performed by introducing high ammonia wastewater (HAW) 48 into the first of several sealed vertical columns 50. In an exemplary embodiment, columns 50 are approximately 5 to 15 ft high (1.5 to 4.5 meters high), typically about 9 ft. (3 meters). In one embodiment, columns 50 are arranged to pump high ammonia wastewater 48 sequentially from one column to the next at set time intervals. As HAW 48 is added to the first of columns 50, a pH adjusting solution 52 is also added to the first column. This pH adjusting solution may consist of sodium hydroxide, sodium carbonate, calcium hydroxide, or other alkaline bases. In case pH adjustment is not needed due to operation design no pH solution would be added.

Each column 50 also has a second pump 54 that independently recirculates the liquid wastewater pooled at the bottom of column 50 up to its top, where it passes through spray nozzles to create small liquid droplets 56 that fall through the air within the sealed column. Each column 50 also receives a continuous flow of air 58 that transports the stripped gaseous ammonia 60 upstream from that column to the previous column in the sequence of columns 50, in a direction opposite to that of high ammonia wastewater 48, with the final ammonia-laden airflow or mixture 62 leaving stripping system 46 at the first column in the sequence of columns 50.

HAW 48 may be moved from one column 50 to the next column 50 sequentially, continuously or on a timed sequence. The flow of air 58 and its entrained gaseous ammonia 60, and the flow of liquid HAW 48 move through columns 50 in a counter-current direction to optimally maximize the concentration of gaseous ammonia 60 while minimizing the required airflow. This disclosed arrangement generates the most efficient ammonia removal and recapture rates in relation to system size.

Tanks or functionally similar embodiments may be employed in lieu of columns 50. A person skilled in the art will appreciate that the columns and/or tanks described herein may have different shapes and configurations. In one possible embodiment, it could be arranged as a corridor divided by baffles, which imitates the columnar function but further reduces ARR footprint size and capital costs. An example of this type of embodiment may include an ARR sub-system housed within an appliance-sized unit having a segmented interior section to perform the ARR function.

Figure 5:
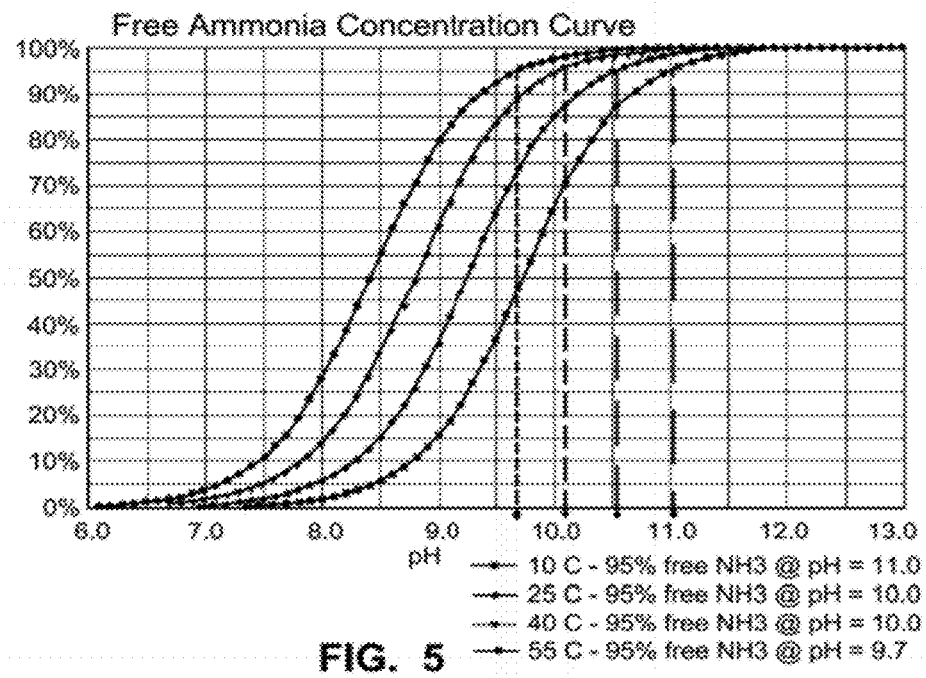
FIG. 5 is a graphical representation of free ammonia concentration in relation to time and temperature in the process of FIG. 2.

Heat can be added to input wastewater 48 or to airflow 58 to enhance this process, in order to shift the percentage of $NH_4$ toward the percentage of ammonia ($NH_3$) equilibrium and eventually toward $NH_3$ gas formation. The addition of heat decreases the amount of hydroxide needed to degas ammonia from wastewater 48. For example, for 95% free ammonia, an ammonia solution must be at a pH of 11.0 @ 10° C., pH 10.5 @ 25° C., pH 10.1 @ 40° C., & pH 9.7 @ 55° C., as shown in the chart depicted on FIG. 5.

The second step of the ARR (step (B2) above) is performed in ammonia recapture system 66 (see FIG. 2) and will be described in greater detail with reference to FIG. 4.

Ammonia-laden air mixture 62 enters a second set of vertical columns 68, each having an independent recirculated flow of low pH acid solution 70, for example, sulfuric acid ($H_2SO_4$). Acid solution 70 passes through nozzles creating small acid droplets that fall through the ammonia-laden airflow 62. These droplets recapture all of the entrained NH3 ammonia gas as NH4 ammonium that further reacts with acid solution 70 to produce a new clean by-product of nitrogen fertilizer, for example, ammonium sulfate 88 (($NH_4)_2SO_4$). An airflow 90 then leaves the recapture system to enter the surrounding environment free of ammonia gas.

Figure 6:
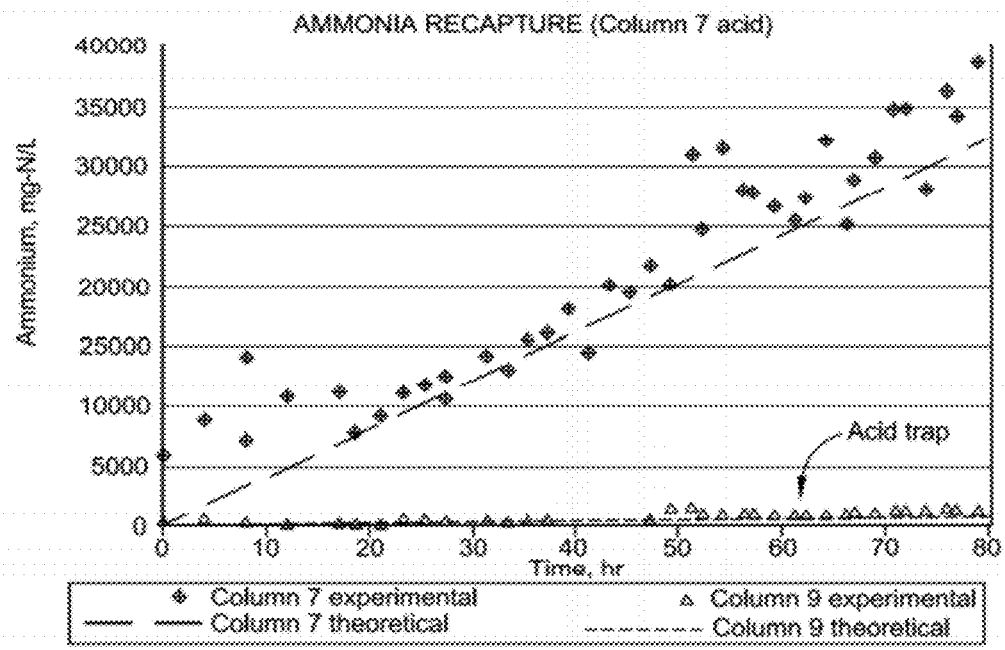
FIG. 6 is a graphical representation of exemplary concentrations of ammonia over time in the acid recapture portion of FIG. 4.

As further shown in FIG. 4, two or more set of columns 68 may be provided in parallel, and one or more columns next to the exit of airflow 90 into the outer environment may be fed with water instead of an acid solution. FIG. 6 depicts the recapture of ammonia with sulfuric acid in the two terminal columns of an eight-column system formed of two parallel sets of four columns.

FIG. 4 also shows that different constructive variations of the present embodiment may be possible, for example, that pH adjusting solution 52 may be fed to leachate 48 before leachate 48 enters columns 50, and that leachate 48 may not be fed continuously to column 50 but may be stored in one or more tanks, basins, or other types of containers 34 that supply leachate 48 to columns 50 on a periodical basis, for example, on a daily basis. Moreover, FIG. 4 shows that the step of adding lime (step (A) above) is optional and may be bypassed. It should be noted that, in a different embodiment of the invention, lime is added to leachate 48 not before the ARR but instead after, such that above described steps (A) and (B) are inverted.

One of the many advantages of ammonia stripping system 46 and ammonia recapture system 66 described herein is their compact size, making it possible to arrange them on movable platforms, either together on a single platform, or on separate platforms. This arrangement provides for an easier delivery of the ARR unit to the desired location and for proper positioning of the ARR at the location of choice.

The ARR causes a significant concentration of ammonia in the by-product obtained, such as ammonium sulfate, that is 75 to 150 times or even greater, depending upon initial ammonia concentration in wastewater 48. For example, if 1300 mg NH3/L are present in raw wastewater, ammonium sulfate solubility is 744,000 mg ($NH_4)_2SO_4$/L water at 20° C., and with 25.8% as $NH_3$, is 192,000 mg $NH_3$/L for 1300 mg/L, or 147 times the initial concentration. If the byproduct, such as concentrated liquid ammonium sulfate is further treated with heat-exchanged cooling or other crystallization techniques, either a slurry or dry, clean ammonium sulfate fertilizer crystal could be produced.

Therefore, the ARR provides the added value of concentrating ammonia nitrogen from wastewater to such an extent that it could become economical to truck or rail these nutrients to more distant locations where conditions are more favorable for large-scale algae production and to generate products such as biofuels.

ARR produces a clean ammonium sulfate fertilizer, even though the source wastewaters such as leachate are often contaminated with pollutants that prevent their safe use as fertilizers.

ARR further permits the use of this clean recycled fertilizer to subsequently grow, harvest, and produce clean food grade algal-based products that would not be possible if produced directly from contaminated landfill/AD wastewater.

The fully pretreated wastewater (in the embodiment of FIG. 4, fully pretreated leachate 72) is now substantially free from ammonia content and is conveyed from the ARR degassing system to a storage unit before further processing and/or introduction to the microalgae treatment system 76 for final nutrient and other pollutants removal.

Before the CEP, an optional pretreatment step may be performed (step (C) above), where biogas containing carbon dioxide ($CO_2$) is added. This step reduces the high pH of ARR treated leachate without further addition of costly chemicals, recycles the carbon dioxide as a nutrient to the CEP algae, prevents the formation of GHG, and cleans the biogas.

Additionally can be used to capture and remove virtually all hydrogen sulfide ($H_2S$) from biogas, while simultaneously reducing the pH of the post-ARR effluent. The removal of $H_2S$ is critical if the biogas is to be burned within electrical generating engines, particularly turbines, where it can be quite corrosive and damaging to these engines.

More particularly, in this step landfill and/or anaerobic digester biogas containing about 45% carbon dioxide and 55% methane ($CH_3$), or another source of $CO_2$ is passed through additional spray columns 74 to saturate the pretreated wastewater with carbon dioxide. This causes a decrease in the high final pH of the ARR pre-treated wastewater prior to feeding to the algae-growing CEP.

Most importantly, this process:

(1) Adds a soluble source of carbon dioxide that maximizes algal growth and nutrient uptake (in particular, an uptake of nitrogen N and phosphorus P). In turn, this provides the lowest concentrations of total nitrogen (TN) and total phosphorus (TP) in the final treated effluent leaving the CEP algae reactors; and (2) Removes carbon dioxide and other acids such as H2S from the biogas, which yields a treated biogas with significantly improved methane and energy content. This greatly enhances the value of the biogas for off-site distribution by making it more competitive with natural gas supplies for heating, transportation fuel, and power plant generation of electricity.

(3) Does not require extra supplemental alkaline chemical addition, media addition, or energy for treating leachate as would be needed for conventional biogas cleaning processes, since leachate alkalinity is already high (typically >1000).

The $CO_2$ gas feedstock can be obtained from a range of sources including, among other things, landfill biogas, anaerobic digester gas, power plant flue gas, refineries, cement plants, and other sources, some of which offer significant cost savings and/or GHG avoidance for this important and expensive algal nutrient.

Therefore, one of the advantages of a process according to the invention is not only the removal of ammonia and other contaminants from a liquid wastewater, but also the purification of biogas to improve burning efficiency, which provides a competitive, non-fossil source of energy.

Still with reference to FIG. 2, the CEP (step (D) above) takes place in treatment system 76, which receives the pretreated leachate 72 and houses the growth of algae.

In particular, the CEP is based on a multi-stage microalgae cultivation and biomass production system that produces dense populations of algae in high-rate algal ponds or growth reactors 78. Preferably, the micro-algae are single-cell algae.

Algal growth reactors 78 are continuously supplied with waste nutrients, such as those found in leachate 32 in the present embodiment, but such nutrients may also be found in wastewaters of agricultural, dairy, landfills, or other origin to support a dense, stable bloom of microalgae. Liquid circulation may be improved through the use of large, efficient paddlewheels 80.

Microalgae are very effective in treating wastewater and are best suited to remove the difficult lower concentrations of nitrogen and phosphorus from high volume wastewaters. In fact, algae excel under such conditions while other treatment systems are either incapable or too costly for removing these low, but still environmentally-consequential levels of nutrients.

With proper control, the algae are maintained in a constant state of rapid growth and assimilate dissolved nutrients in the surrounding water into their biomass. This initial phase of the CEP process is comparable to a conversion step, in which dissolved carbon dioxide, nitrogen and phosphorus are converted into the living particulate matter of algal cells.

The CEP can be optimized for algal biomass production through management of various physical parameters such as paddlewheel mixing rates, pond depth, water velocity, system retention time, sedimentation velocities, and other control variables.

The CEP algal growth reactors can be operated with several distinct functional purposes as a strategy to achieve an overall more efficient treatment process. For example some are operated for the primary function of maximizing algal productivity and algae harvest ("Mass Removal" CEP) and some for the primary function of minimizing effluent concentration of nutrients and other pollutants ("Polisher" CEP). For example, one CEP contains algae growing in its exponential growth phase to produce high amounts of algal biomass, but the resulting effluent contains considerable N and P concentrations to permit this fast efficient algal growth. Then in a subsequent CEP, a Polisher reactor, a second population of algae is purposely starved for nutrients rather than growing exponential, here, nutrients can be reduced even further to low nutrient levels possibly <1 mg/L total N and P. Additionally in this second step other pollutants are broken down by algae or photo oxidation. This operational strategy optimizes net algal productivity as well as nitrogen, phosphorous, and subsequent removal of other pollutants, even though N & P are critical nutrients required for algae survival.

Another aspect of CEP algal treatment is that algal treatment improves the unusually poor UV transmissivity found in landfill leachate, from as low as 0% transmissivity, even after ARR or bacterial treatment to 28% transmissivity, or possibly higher, following algal treatment. Algae-based leachate treatment may have a role in permitting the continuing discharge of treated landfill leachate at POTW's as UV disinfection replaces chlorination by new EPA regulations.

Another beneficial effect of the CEP treatment (along with pretreatment) for landfill leachate, industrial wastes, and many similar high strength wastewaters is that algae treatment can significantly reduce the fouling rate of membranes used in subsequent treatment processes such as reverse osmosis membranes typically used for TDS, salt, and/or chloride removal from wastewater.

In a successive step of the process according to the present embodiment (step (E) above), algal cells are harvested to produce a final treated wastewater effluent 86 with low TN and TP. This critical process is performed in an algal harvest and clarification system 82 and removes the microalgae and its assimilated nutrient biomass, thereby enabling the return to the outer environment of effluent wastewater having low total suspended solids (TSS) and low nutrients.

One of the complexities of this step is that the individual algal cells are extremely small and have a specific gravity that is nearly identical to water. There have been many attempts to develop technologies for the harvest of single-celled algae from water, most often based on filtration, centrifugation, flotation, or settling concepts. Significant advancements have been made recently in the development of practical algae harvest technologies that economically harvest and concentrate algal biomass. Such advancements involve co-cultivation of other aquatic species that enhance algal settling (U.S. Pat. Nos. 6,192,833 PAS and 7,258,790 CEP), an induced algal bioflocculation (see US Patent Application Publication No. US 2010/0264094 A1), and in certain wastewater treatment applications, centrifugation.

Finally, treated leachate 86 is released to the external environment. A portion or all of treated leachate 86 may also be used to feed CEP treatment units 78 (see details in FIG. 2), mixed with raw leachate, and/or feed units 38 where metal and other contaminants are removed (see details in FIG. 4).

It should also be noted that part of the current cost of treating high ammonia wastewaters involves the collection and transport of the wastewater to another location for treatment. The remaining cost is for treatment services at that remote location. The ability to produce clean effluents using a process according to the present invention will allow onsite treatments, generating significant cost savings. Other times, off-site transport of wastewater will be required even when the above described treatment processes are applied successfully, because some local environments do not allow any effluent discharge. In that case, treatment and storage of significant amounts of degassed wastewater may be required at a remote location.

Figure 10:
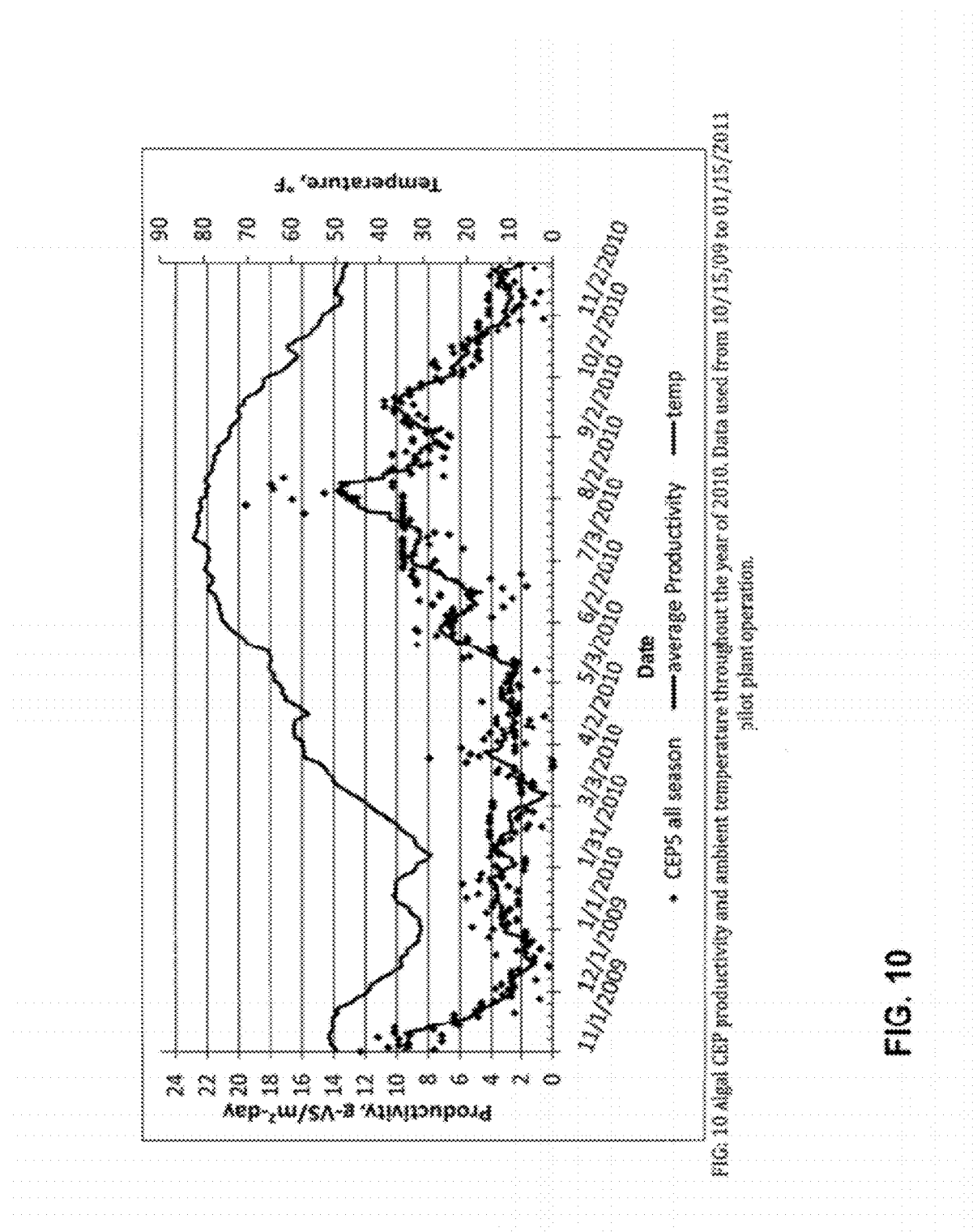
FIG. 10 is a graphical representation of exemplary algal productivity data throughout a year shown along with ambient temperature.

In some cases, CEP algal systems may be used in areas with climates that are unsuited for year-round algae production. FIG. 10 and FIG. 11 show exemplary experimental data of algal productivity throughout the year and seasons, it shows that productivities below 3 mg-VS/m2-day can be expected during the winter time. In that event, algae ponds may offer wintertime storage capacity for holding pre-treated wastewater (which has been ammonia degassed/recovered) until spring temperatures are warm enough to allow renewed algal operations.

When wastewater is stored in the CEP units, inexpensive solar transparent covers 84 can be placed as needed over the CEP units to selectively divert and prevent rainfall from entering the CEP algae systems. At the same time, covers 84, for example greenhouse structures, can be erected to allow free airflow movement from outside the covers and between the water and covers such that normal evaporation and moisture loss can still occur. In addition, evaporation can be enhanced through heat, wind or other means to further increase evaporation.

Therefore, a system of covers 84 will permit a managed reduction of total effluent wastewater flow in most areas without reducing algal treatment capacity. Advantages to be derived therefrom include:
(1) Significantly reduced overall annual wastewater effluent volume;
(2) Significantly reduced cost of trucking wastewater for final treatment or discharge;
(3) Managed storage of pre-treated wastewater within CEP algal units 78 during colder winter months;
(4) Annual management solution for accepting continuous wastewater inflow while permitting extended periods with no treated effluent discharge, without building additional wastewater storage resources.

Figure 12:
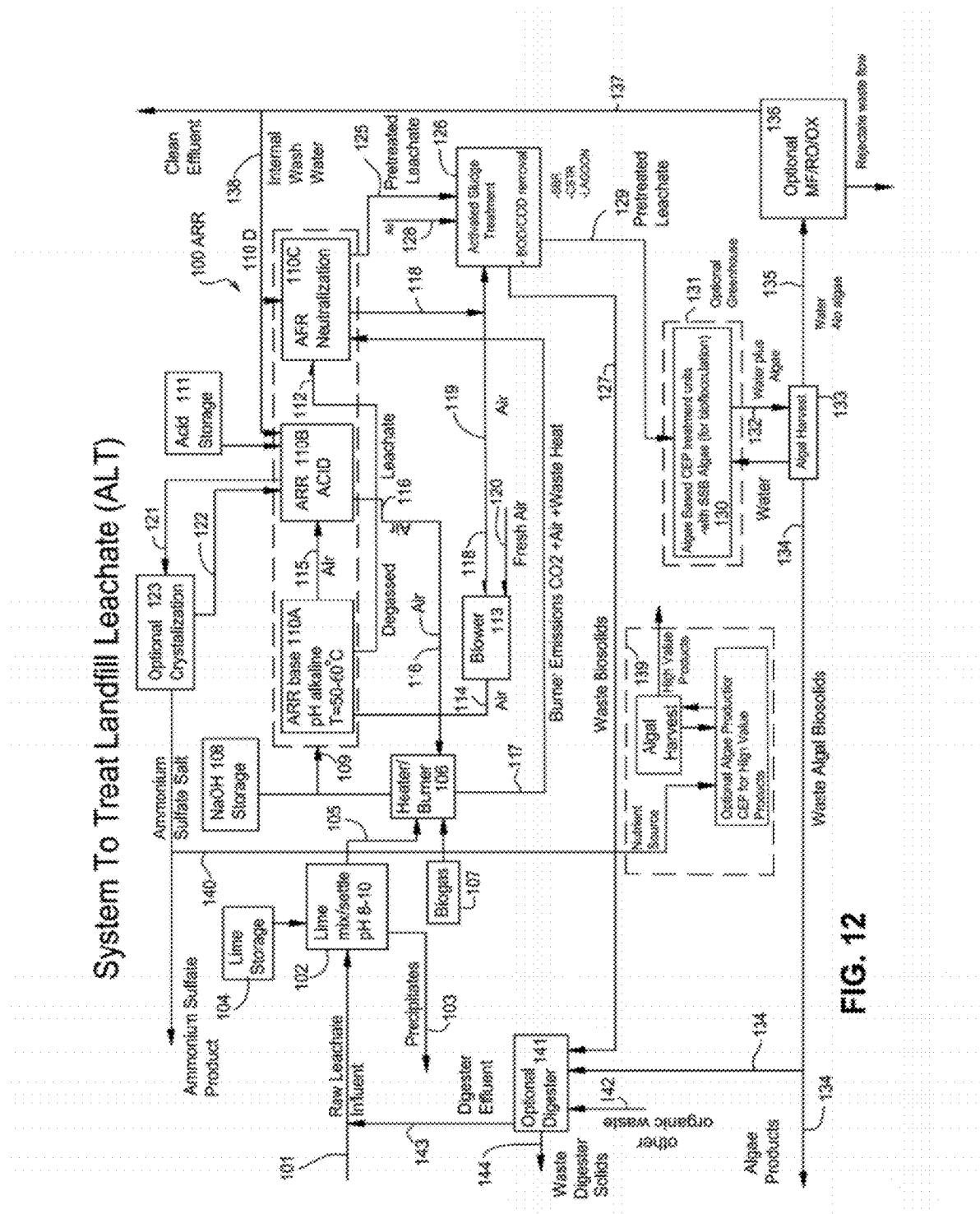
FIG. 12 illustrates a diagrammatic view of an exemplary process flow diagram according to the invention.

The above described steps, as well as additional optional steps, will now be described in the embodiment of the invention as shown in FIG. 12, which includes additional steps over the embodiment shown in FIGS. 1-4.

With reference to FIG. 12 in the present embodiment of the invention the system to treat landfill leachate or other high nitrogen-contaminated wastewaters, and treatment method includes, but is not limited to, chemical precipitation 102, ammonia removal and recapture (ARR) 110, optional crystallization 123, activated sludge treatment (AS) 126, CEP treatment units 130 and 139, anaerobic digester (AD) 141, algal sedimentation enhancement and harvest unit 133, optional reverse osmosis (RO), microfiltration (MF) and ozone oxidation (OX) unit 136.

This embodiment includes not only the treatment of raw landfill leachate influent 101, but also of digestible organic wastes 142, such as municipal organic waste (MOW) in an optional anaerobic digester 141.

Since MOW is not easily digestible by itself, co-digestants, such as algae biomass 134 and bacterial bio-solids 127 or others may be used to optimize biogas production, stabilize digestion, and improve overall for cost efficiency of the MOW digestion process.

Digester effluent 143 is rich in ammonia, typically >800 mg/L and can be combined with the incoming landfill leachate 101. Stabilized waste solids 144 can be put back on the landfill for further degradation, biogas 107 produced could be used to feed a heater 106 to heat the basified leachate 109 entering the ARR 110 to improve degassing and to reduce footprint.

Hydroxide precipitation 102 with lime 104, NaOH 108, or other bases is performed on raw leachate influent prior to heating with a heating device 106 such as a boiler, heat exchanger, electric heater, gas heater, waste heat addition, or other.

The ARR in this embodiment also includes ammonia degassing 110A, ammonia recapture 110B, and pH neutralization of ARR treated effluent 110C using landfill biogas or other carbon dioxide laden fuel emission gases 117 discharged from a burner, incineration flame, or flare 106. In addition, the degassed airflow leaving the acid recapture 110B is routed to the burner, incineration flame, or flare 106 for combustion. This is done because degassed airflow leaving the ARR can contain significant concentrations of volatile organic compounds (VOC) from leachate degassing process 110A and this step destroys these VOC's and prevents their escape to the surrounding environment. Once incinerated the additional $CO_2$ and waste heat can be recycled for leachate neutralization 110C.

After incineration, the ARR degassed air flow may be returned to 110A and recycled multiple times in this manner within the ammonia degassing and recovery process. This recycle loop reduces the atmospheric air flow entering 120 and the effluent air exiting to the outside environment 119. This both conserves incineration fuel, heat and energy within the ARR system, and minimizes the potential emission of pollutants into the atmosphere.

Still with reference to FIG. 12 after ARR neutralization 110C, pretreated leachate 125 is routed into an activated sludge (AS) tank 126 for bacterial treatment of organic carbons present in leachate. This is done to reduce readily biodegradable organic carbon prior to algal treatment with CEP 130 to reduce bacterial growth in CEP. AS treatment can be performed in batch reactors (BR), sequencing batch reactors (SBR), continuous stirred tank reactors (CSTR), plug flow reactors (PFR), single or in series or any other type of reactor such as lagoons or ponds.

It is to be noted that the bacterial treatment is performing additional beneficial treatment, such as nitrification, ammonification of organic nitrogen, degradation of organic carbon, and other pollutants, such as xenobiotics.

It should also be noted that performing bacterial treatment on leachate without prior ammonia removal requires a large increase in the AS system size and operating energy costs. This becomes necessary due to A) the need for the AS to perform nitrification and denitrification on a significantly larger load of nitrogen (the added ammonia), and B) to counteract possible influent ammonia toxicity effects to the AS bacteria. For example, when performing ARR prior to AS on leachate, hydraulic retention times less than 24 hours are sufficient for complete BOD treatment, but without ARR pretreatment, retention times of greater than 12 days are needed to overcome leachate toxicity. At these high retention times a supplemental carbon source such as methanol is needed to sustain MLVSS in the reactor vessel, and to perform denitrification needed for nitrogen removal. The ARR pretreatment step can significantly improve AS performance, and reduce its capital and operating costs.

Hydroxide oxidation the ARR transforms some very slowly degradable or inert organic carbon and nitrogen constituents present in leachate into more biodegradable forms that can be more easily treated in subsequent AS and CEP steps. In particular, this makes COD more treatable in AS processes. Through hydroxide oxidation in the ARR some poorly biodegradable organic nitrogen will be converted into ammonia and degassed, or converted into more biodegradable organic nitrogen. ARR can be used to make poorly biodegradable organic carbon or nitrogen into more biodegradable organic carbon or nitrogen.

Still with reference to FIG. 12 waste, bio-solids 127 can be fed to an anaerobic digester, treated AS effluent 129 where solids have been removed through sedimentation is routed into CEP 130 where treatment is performed as previously discussed.

CEP 130 reduces or breaks down inorganic and organic nitrogen, phosphorus, metals, EPA priority pollutants, UV absorbing and other poorly biodegradable compounds, as well as many other pollutants to very low concentrations in the water column by assimilation, and/or other mechanisms (see FIG. 13). Treatment to such low concentrations is a unique quality of algae, in particular CEP, and not cost effective using biological processes of prior art, such as activated sludge.

Additionally CEP reduces the fouling potential of RO, MF or other membranes 136 used for subsequent TDS, chloride, or salt removal, or other treatments if required. CEP effluent water composition is more "plant-like", leading to a substantially reduced fouling potential compared to "bacterial-like" effluents typical for effluents from standard AS or other bacterial-based treatment systems. The present invention can significantly reduce the costs of membrane filtration treatment for wastewaters needing membrane filtration prior to final discharge.

Algal harvest can be performed through different methods, such as centrifuge, coagulation/flocculation, air flotation, electro floatation, sedimentation, or bio flocculation in a clarifier, such as a lamellar settler or other processes of harvesting biomass. The Ammonia Leachate Treatment Process (ALT) utilizes bioflocculation with algae conditioned with a process called Serial Selection for Bioflocculation (see US Patent Application Publication No. US 2010/0264094 A1) combined with an internal harvester/clarifier.

Still with reference to FIG. 12 cleaned effluent after CEP 135 or after MF/RO membrane filtration 137 can be directly discharged, or used for internal freshwater usage 138.

Ammonium sulfate solution produced 121 by the ARR acid recapture 110B can either be directly used or further crystallized to make ammonium sulfate salt that in its "dry" form contains only about 20% water, further reducing costs of trucking fertilizer to distant locations. For example, to produce non-contaminated high value products used for human consumption in an additional CEP treatment unit 139 that has not been in contact with leachate and can be considered clean of pollutants.

The invention embodied in the process shown in FIG. 12 can extract clean nutrients from contaminated wastewaters like leachate to make high value products, such as nutraceuticals, pharmaceuticals or others.

The present embodiment maximizes the energy and nutrient recovery from nitrogen rich wastewaters like leachate 101 in combination with the digestion of municipal organic wastes. The nitrogen recovered can be used along with CO2 emissions to harvest sunlight energy, later recovered in an optional anaerobic digester 141. Anaerobic digesters produce a nutrient rich discharge, very similar in this regard to landfill leachate that would otherwise require increased treatment cost, as previously described for leachate. This invention provides a method to reduce the costs of anaerobic digestion by taking effluent nutrients and recycling them along with captured CO2 (a greenhouse gas or "GHG") to produce more energy in the form of combustible biogas 107.

Example

A method of treatment was tested, which included optional chemical precipitation, ARR, AS, CEP and optional MF/RO for the treatment of municipal landfill leachate.

Figure 7:
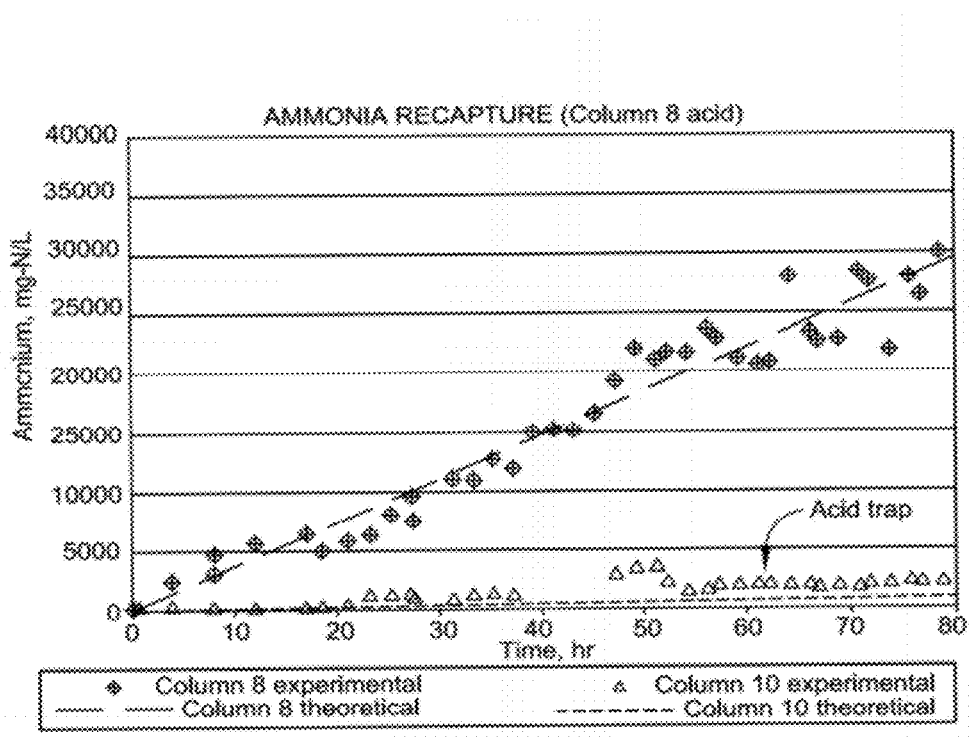
FIG. 7 is another graphical representation of exemplary concentrations of ammonia over time in the acid recapture portion of FIG. 4.
Figure 8:
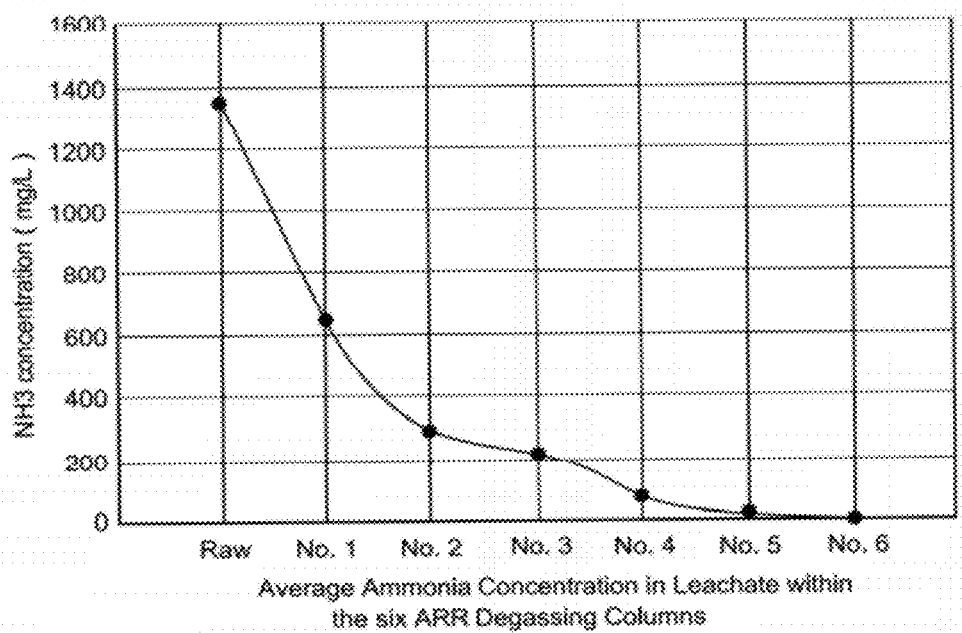
FIG. 8 is a graphical representation of exemplary ammonia concentration in all columns of the degassing portion of FIG. 4.

An ARR ammonia degassing and recapture system, including prior chemical precipitation, was implemented using various chemical base-additions to increase pH to about 8.5 to >12 including calcium hydroxide (lime) and/or sodium hydroxide. The system was initially tested to refine operational procedures, fix liquid leaks, verify ammonia recapture effectiveness and check lab analysis procedures. The system was then operated and performed satisfactorily, as well as or better than a previous small-scale research system. Ammonia concentrations in raw leachate (750-1450 mg $NH_3$/L) was reduced to less than 15 mg $NH_3$/L, corresponding to a 99% reduction, in 6 hours of operation with an input rate of 100 L of leachate per hour (26.4 gallons per hr.), degassing pH of 10.5, and ambient temperature (compare FIG. 8). Ammonia in the sulfuric acid columns was also successfully recaptured as ammonium sulfate (compare FIG. 6 and FIG. 7).

While the ARR degassing air flow created and delivered gaseous ammonia concentrations in excess of 100 mg $NH_3$/L to the acidic recapture columns, no ammonia could be measured in the air stream that was finally discharged. Minimum measurement capacity was 1 mg $NH_3$/L.

Figure 9:
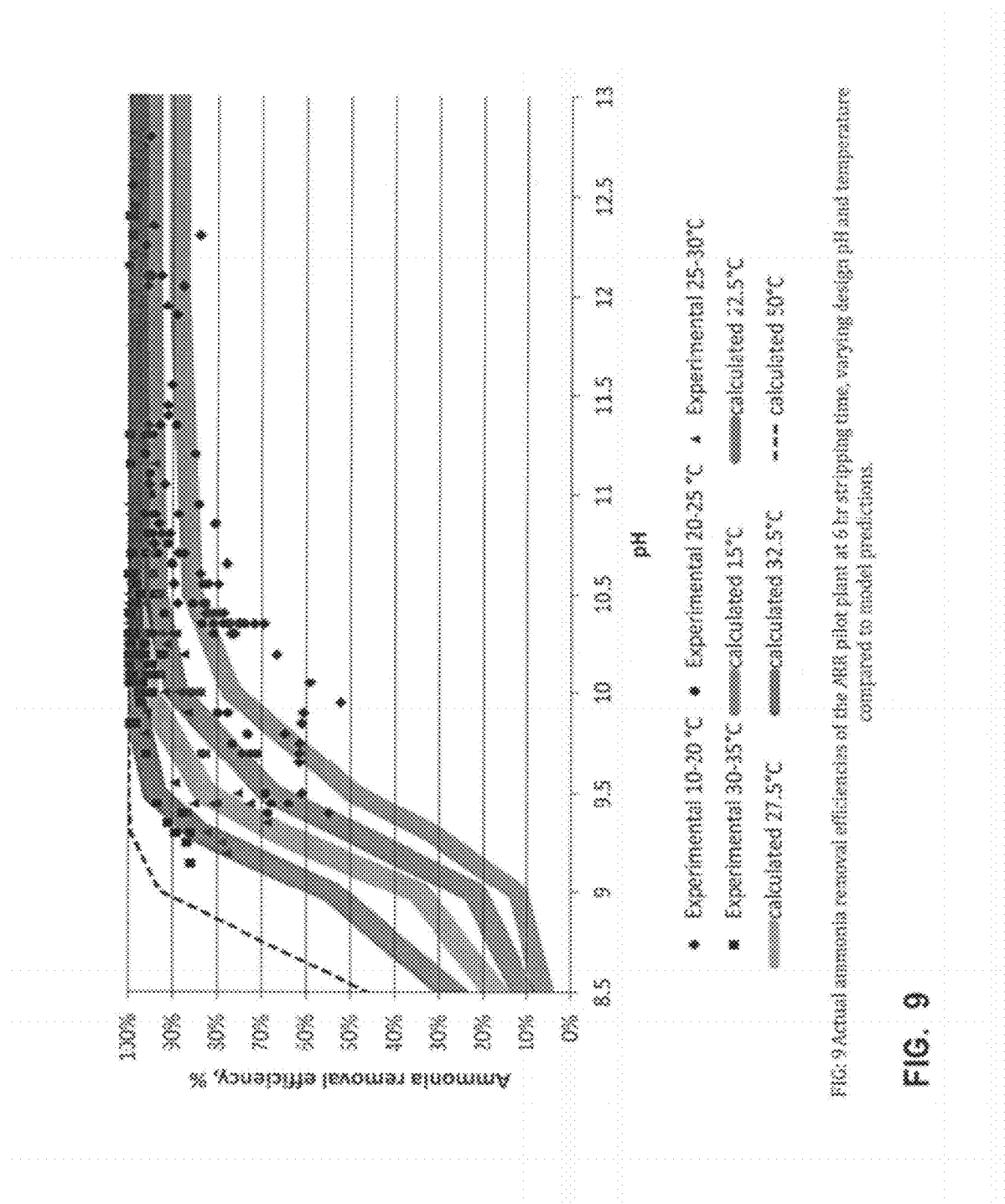
FIG. 9 is a graphical representation of exemplary ammonia removal efficiencies in the degassing portion of FIG. 4 for different design temperatures vs. pH.

Heating ammonia-degassing columns lead to an increased ammonia removal as anticipated. A comparison between calculated and measured ammonia removal efficiencies is shown in FIG. 9.

The recycling of ARR air after ammonia recovery back to the air intake of the degassing columns was found to have no negative effect on the ammonia degassing process.

The ARR was demonstrated to alter the organic carbon composition during the treatment, where raw leachate had approximately 1,000 mg/L biodegradable COD and 3,500 mg/L non-biodegradable COD, ARR pretreated effluent had 2,000 mg/L biodegradable COD and only about 2,000 mg/L non-biodegradable COD, allowing for better COD removal in the subsequent AS.

The AS sequencing batch reactor was successful in removing organic carbon from ammonia-reduced ARR effluent prior to CEP treatment. Design parameters for the AS were solids retention time (SRT)>20 days, hydraulic retention time (HRT) 2 days, DO of >4.0 mg/L, MLVSS concentration of >3000 mg/L. AS systems operated without prior ARR treatment required HRT's well above 12 days and supplemental carbon was needed to allow for nitrification/denitrification for nitrogen removal.

An automated continuous-flow centrifuge and the necessary input and return piping were installed for harvesting algae after the CEP. In particular, this centrifuge harvested algae and returned the supernatant water to three separate and distinct CEP algae reactors. The centrifuge operated well and the automatic algae harvest discharge functioned properly. No signs of negative impact from using leachate as the sole nutrient source for algal growth were observed.

The CEP successfully employed other harvesting techniques like DAF and the use of the SSB technology.

Research into fouling potential of CEP-effluent (algae free) onto RO or MF membranes showed that due to the extended algal treatment, water composition was more "plant-like", leading to a reduced fouling potential compared to "bacterial-like" effluents typical for effluents coming from standard AS systems.

UV-absorbing compounds, as they can be present in landfill leachate, were shown to be reduced during the algal polishing. Where raw leachate samples and AS pretreated effluent had 0% UV transmittance, the CEP effluent improved UV transmissivity to 28%, and greater.

While the invention has been described in connection with a number of embodiments, it is not intended to limit the scope of the invention to the particular forms set forth, but on the contrary, it is intended to cover such alternatives, modifications, and equivalents as may be included within the scope of the invention.

This invention may have several different applications of the embodied processes and technology depending upon the ultimate objective or goal. A key component of this invention involves algae-based treatment, especially CEP, SSB, and other described algal processes, which are uniquely distinguished for their ability to economically assimilate, convert, or treat by other mechanisms, most wastewater pollutant constituents down to very low concentrations.

In one categorical application, the primary purpose or objective is to treat leachate, anaerobic digester digestate, or other similar nitrogen-contaminated wastewater, especially those high in ammonia concentrations, with algae-based treatment and other supporting treatment technologies for the purpose of providing a finished "clean" water that can be discharged to the environment under the stringent and ever-increasing EPA NPDES discharge standards. In this application, some of the invention's processes are employed to most cost-effectively pre-treat and reduce the mass bulk of pollutants found in these wastewaters such as ammonia, nitrate, nitrite, organic nitrogen, heavy metals, EPA priority pollutants, TDS and others. The unique abilities of algae-based treatment systems are then optimized to cost-effectively "polish" the pollutants down to very low concentrations, often in the low "parts per billion" level, that would otherwise not be economically possible by other treatment technologies. This strategy reduces the amount of algae acreage required and thereby significantly decreases the overall capital and operating costs of the algae-based treatment system.

In another categorical application, the primary purpose or objective is to convert valuable pollutant constituents found in leachate, anaerobic digester digestate, or other similar nitrogen-contaminated wastewater, especially those high in ammonia concentrations, into valuable algae-based products. In this application, the treatment of the wastewater can still occur, but the treatment process and resulting clean water becomes the byproduct. While requiring greater project size, capitalization, and risk, this application offers greater product value generation from algae-based products such as animal or human food products including protein, lipids, and nutraceuticals.

In another categorical application, the primary purpose or objective is to remove ammonia from leachate, anaerobic digester digestate, or other similar nitrogen-contaminated wastewater, especially those high in ammonia concentrations, using the ARR pre-treatment process:

1) To allow for the economical but continued disposal and further treatment of such nitrogen-contaminated wastes to municipal sewage treatment systems or POTWs (Publicly Owned Treatment Works). By removing the ammonia, both the bacterial toxicity and the large energy cost requirements for oxidizing ammonia are substantially reduced when using existing traditional bacterial-based treatment in POTW's.

2) To convert the contaminated source ammonia into a clean algae fertilizer such as ammonium sulfate, ammonium chloride, or other ammonia or nitrogen materials that can be fed to non-contaminated algae production systems to produce clean algae-based products such as animal or human food products including protein, lipids, and nutraceuticals.

3) To similarly convert the contaminated source phosphorus into similarly clean algae phosphorus fertilizers for algae production systems.

Using the algal/bacterial system to produce algal and bacterial biomass to use as co-digestants in anaerobic digestion of municipal organic waste (MOW) or other carbon rich organic wastes and then use ARR to treat remaining effluent.

ARR incorporates several unique and novel concepts some of which include the following. The internal recycle of the stripping and recovery air flow reduces the required airflow that enters and exits the ARR system. This reduces the ARR heating requirements and maximizes ammonia transfer rates. Furthermore, the lower exiting ARR air flow permits an optimized flare incineration (using landfill or anaerobic biogas or other fuel) of any remaining VOC's or other pollutants contained in this exiting effluent ARR air flow. The heat generated from this incineration can then be recycled as the heat source for the ARR system, and the $CO_2$ generated from this incineration (an acid) can be used to neutralize the pH of the alkaline pre-treated leachate leaving ARR. In so doing, the $CO_2$ transferred into the pre-treated leachate becomes available as a $CO_2$ source required by the CEP algae. In another scenario, landfill or anaerobic digester biogas can be fed directly to neutralize the pre-treated leachate, resulting in the removal of $CO_2$ and $H_2S$ from the biogas, and thereby both increasing the methane content of the exiting biogas and cleaning it of corrosive $H_2S$ which can be damaging to turbine engines. Also, the general physical design of ARR incorporates several unique ideas including specialized countercurrent cross-flow patterns of gas and leachate across both the stripping and recovery functions without having discreet physically-enclosed staged compartments, as well as multiple linked processes that combine internally recycled heat, $CO_2$, and biogas cleaning functions.

We claim:

1. A system for treating nitrogen-rich wastewater, comprising:
    (a) an ammonia removal and recovery process (ARR) subsystem to perform ammonia degassing and ammonia recapture steps;
    (b) an activated sludge (AS) subsystem to perform bacterial treatment; and
    (c) a controlled eutrophication process (CEP) subsystem to perform an algae-based water treatment step;
    whereby said ARR subsystem acts to remove and recapture ammonia and to destroy volatile organic compounds, said AS subsystem acts to remove biodegradable organics and lowers biological oxygen demand (BOD), to allow increased algae culturing in said CEP subsystem, and said CEP subsystem acts to remove recalcitrant organic compounds and improves UV transmissivity and UV disinfection.

2. The system for treating nitrogen-rich wastewater according to claim 1, wherein said controlled eutrophication process (CEP) subsystem includes algal growth reactors operated for the function of a mass removal CEP, maximizing algal productivity and algae harvest.

3. The system for treating nitrogen-rich wastewater according to claim 1, wherein said controlled eutrophication process (CEP) subsystem includes algal growth reactors operated for the function of a polisher CEP, minimizing effluent concentration of nutrients and other pollutants.

4. The system for treating nitrogen-rich wastewater according to claim 1, wherein said ammonia removal and recovery process (ARR) subsystem functions to recycle air internal to the ARR subsystem, facilitates both base degassing and acid recapture, and acts to conserve heat and to minimize the amount of exiting air flow that requires incineration.

5. The system for treating nitrogen-rich wastewater according to claim 1, further including a chemical precipitation subsystem.

6. The system for treating nitrogen-rich wastewater according to claim 1, further including a post treatment or polishing step subsystem.

7. The system for treating nitrogen-rich wastewater according to claim 6, wherein said post treatment or polishing step subsystem further includes a microfiltration membrane filter, reverse osmosis and ozone oxidation sub-system.

8. The system for treating nitrogen-rich wastewater according to claim 1, further including an anaerobic treatment subsystem.

9. The system for treating nitrogen-rich wastewater according to claim 8, wherein said anaerobic treatment subsystem comprises an anaerobic digester (AD).

10. The system for treating nitrogen-rich wastewater according to claim 1, wherein said ARR subsystem acts to produce an ammonium sulfate fertilizer by-product.

11. The system for treating nitrogen-rich wastewater according to claim 1, further including biogas addition of carbon dioxide and a biogas cleaning pre-treatment step.

12. The system for treating nitrogen-rich wastewater according to claim 11, wherein said biogas addition of carbon dioxide and a biogas cleaning pre-treatment step includes biogas cleaning/scrubbing using ARR liquid effluent resulting in the removal of hydrogen sulfide and carbon dioxide from the biogas, the pH neutralization of the ARR liquid effluent, and the reuse of this carbon dioxide by the CEP algae.

13. The system for treating nitrogen-rich wastewater according to claim 12, wherein said ARR subsystem reuses and recycles heat and carbon dioxide given off by biogas flares and biogas incineration emissions.

14. A method for treating nitrogen-rich wastewater, comprising the steps of:
    (a) providing an ammonia removal and recovery process (ARR) subsystem to perform ammonia degassing and ammonia recapture steps;
    (b) providing an activated sludge (AS) subsystem to perform bacterial treatment; and
    (c) providing a controlled eutrophication process (CEP) subsystem to perform an algae-based water treatment step;
    whereby said ARR subsystem acts to remove and destroy volatile organic compounds and converts ammonia to a free gaseous state, said AS subsystem acts to remove biodegradable organics and lowers biological oxygen demand (BOD), to allow increased algae culturing in said CEP sub-system, and said CEP sub-system acts to remove recalcitrant organic compounds and improves UV transmissivity and UV disinfection.

15. The method of treating nitrogen-rich wastewater according to claim 14, wherein said step of providing a controlled eutrophication process (CEP) subsystem includes providing algal growth reactors operated for the function of a mass removal CEP, maximizing algal productivity and algae harvest.

16. The method of treating nitrogen-rich wastewater according to claim 14, wherein said step of providing a controlled eutrophication process (CEP) subsystem includes providing algal growth reactors operated for the function of a polisher CEP, minimizing effluent concentration of nutrients and other pollutants.

17. The method of treating nitrogen-rich wastewater according to claim 14, wherein said ammonia removal and recovery process (ARR) subsystem functions to recycle air internal to the ARR sub-system, facilitates both base degassing and acid recapture, and acts to conserve heat and to minimize the amount of exiting air flow that requires incineration.

18. The method of treating nitrogen-rich wastewater according to claim 14, further including the step of providing a chemical precipitation subsystem.

19. The method of treating nitrogen-rich wastewater according to claim 14, further including the step of providing a post treatment or polishing step subsystem.

20. The method for treating nitrogen-rich wastewater according to claim 19, wherein said step of providing a post treatment or polishing step subsystem further includes providing a microfiltration membrane filter, reverse osmosis and ozone oxidation sub-system.

21. The method of treating nitrogen-rich wastewater according to claim 14, further including the step of providing an anaerobic treatment subsystem.

22. The method of treating nitrogen-rich wastewater according to claim 21, wherein said step of providing an anaerobic treatment subsystem includes providing an anaerobic digester (AD).

23. The method for treating nitrogen-rich wastewater according to claim 14, wherein said ARR subsystem acts to produce an ammonium sulfate fertilizer by-product.

24. The method for treating nitrogen-rich wastewater according to claim 14, further including the step of providing biogas addition of carbon dioxide and providing a biogas cleaning/scrubbing pre-treatment step.

25. The method for treating nitrogen-rich wastewater according to claim 24, wherein said the step of providing biogas addition of carbon dioxide and a biogas cleaning pretreatment step includes biogas cleaning/scrubbing using ARR subsystem liquid effluent resulting in the removal of hydrogen sulfide and carbon dioxide.

26. The method for treating nitrogen-rich wastewater according to claim 25, wherein said ARR subsystem reuses and recycles heat given off by biogas emissions incineration.

* * * * *